(12) United States Patent
Hasegawa

(10) Patent No.: US 7,596,295 B2
(45) Date of Patent: Sep. 29, 2009

(54) MAGNETIC DISK DEVICE

(75) Inventor: Shin-ya Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 47 days.

(21) Appl. No.: 11/455,725

(22) Filed: Jun. 20, 2006

(65) Prior Publication Data

US 2007/0230048 A1    Oct. 4, 2007

(30) Foreign Application Priority Data

Mar. 28, 2006    (JP) ............... 2006-089041

(51) Int. Cl.
*G02B 6/10* (2006.01)
(52) U.S. Cl. .................. 385/146; 385/147
(58) Field of Classification Search .......... 385/146, 385/147
See application file for complete search history.

(56) References Cited

U.S. PATENT DOCUMENTS

| | | |
|---|---|---|
| 6,795,380 B2 | 9/2004 | Akiyama et al. |
| 6,930,975 B2 | 8/2005 | Tawa et al. |
| 6,950,598 B1 | 9/2005 | Tawa et al. |
| 2004/0062503 A1 | 4/2004 | Challener |
| 2004/0194119 A1 | 9/2004 | Miyanishi et al. |
| 2005/0157393 A1 | 7/2005 | Hasegawa et al. |
| 2005/0157595 A1 | 7/2005 | Tawa et al. |

FOREIGN PATENT DOCUMENTS

| | | |
|---|---|---|
| JP | 2000-195002 | 7/2000 |
| JP | 2001-134971 | 5/2001 |
| JP | 2002-298302 | 10/2002 |
| JP | 2004-551177 | 11/2002 |
| JP | 2003-45004 | 2/2003 |
| JP | 2004-570139 | 3/2003 |
| JP | 2004-30840 | 1/2004 |
| JP | 2004-303299 | 10/2004 |
| JP | 2005-999527 | 8/2005 |
| JP | 2006-73105 | 3/2006 |
| WO | 2005/112014 | 11/2005 |

OTHER PUBLICATIONS

Office Action issued in corresponding Korean Patent Application No. 10-2006-0061726, on Aug. 28, 2007.
Extended European Search Report mailed Oct. 16, 2008 in corresponding EP Patent Application EP 06 25 3136.3.

*Primary Examiner*—Jennifer Doan
(74) *Attorney, Agent, or Firm*—Staas & Halsey LLP

(57) ABSTRACT

A magnetic disk device performs magnetic recording by generating a magnetic field using an electric current on a light-irradiated surface of a recording medium. A head unit is formed by laminating an optical film that transmits a light and a metal film through which the electric current flows. A light exposing unit irradiates the light in such a manner that the light is transmitted through the optical film and irradiated on a surface of the recording medium. An electric-current output unit outputs the electric current to the metal film.

16 Claims, 15 Drawing Sheets

MAGNETIC DISK DEVICE

BACKGROUND OF THE INVENTION

1. Field of the Invention

The present invention relates to a magnetic disk device that performs magnetic recording by generating a magnetic field using electric current on a light-irradiated surface of a recording medium.

2. Description of the Related Art

Recently, a heat-assisted magnetic recording method is increasingly used as a technology that enables high density magnetic recording. The heat-assisted magnetic recording method carries out magnetic recording on a magnetic recording medium that is highly retentive to thermal fluctuation. In the heat-assisted magnetic recording method, light is focused on a surface of the magnetic recording medium to increase the temperature of the magnetic recording medium in phases, and a portion that undergoes increase in the temperature is exposed to a magnetic field to carry out magnetic recording. In the heat-assisted magnetic recording method, although exposing the recording medium to the light increases the temperature of the recording medium, the recording medium needs to be immediately exposed to the magnetic field to prevent thermal fluctuation.

For example, a data recording head which includes a magnetic field generating element and a heat generating unit are disclosed as a technology of the heat-assisted magnetic recording method in Japanese Patent Laid-Open Publication No 2004-303299. The magnetic field generating element passes electricity through a metal plate including a constrictor that constricts the electric current, and generates a magnetic field to carry out magnetic recording. The heat generating unit generates heat on the metal surface by exposing the constrictor to a laser beam from below.

However, in the conventional technology, manufacturing and especially narrowing of the metal constrictor is minute and difficult. Moreover, a separate reading head needs to be attached with great precision for using a magnetic reading head to play the magnetic recording medium. Thus, a magnetic recording head cannot be manufactured easily (for example, manufactured by using a wafer process).

SUMMARY OF THE INVENTION

It is an object of the present invention to at least partially solve the problems in the conventional technology.

A magnetic disk device according to one aspect of the present invention performs magnetic recording by generating a magnetic field using an electric current on a light-irradiated surface of a recording medium. The magnetic disk device includes a head unit that is formed by laminating an optical film that transmits a light and a metal film through which the electric current flows; a light exposing unit that irradiates the light in such a manner that the light is transmitted through the optical film and irradiated on a surface of the recording medium; and an electric-current output unit that outputs the electric current to the metal film.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
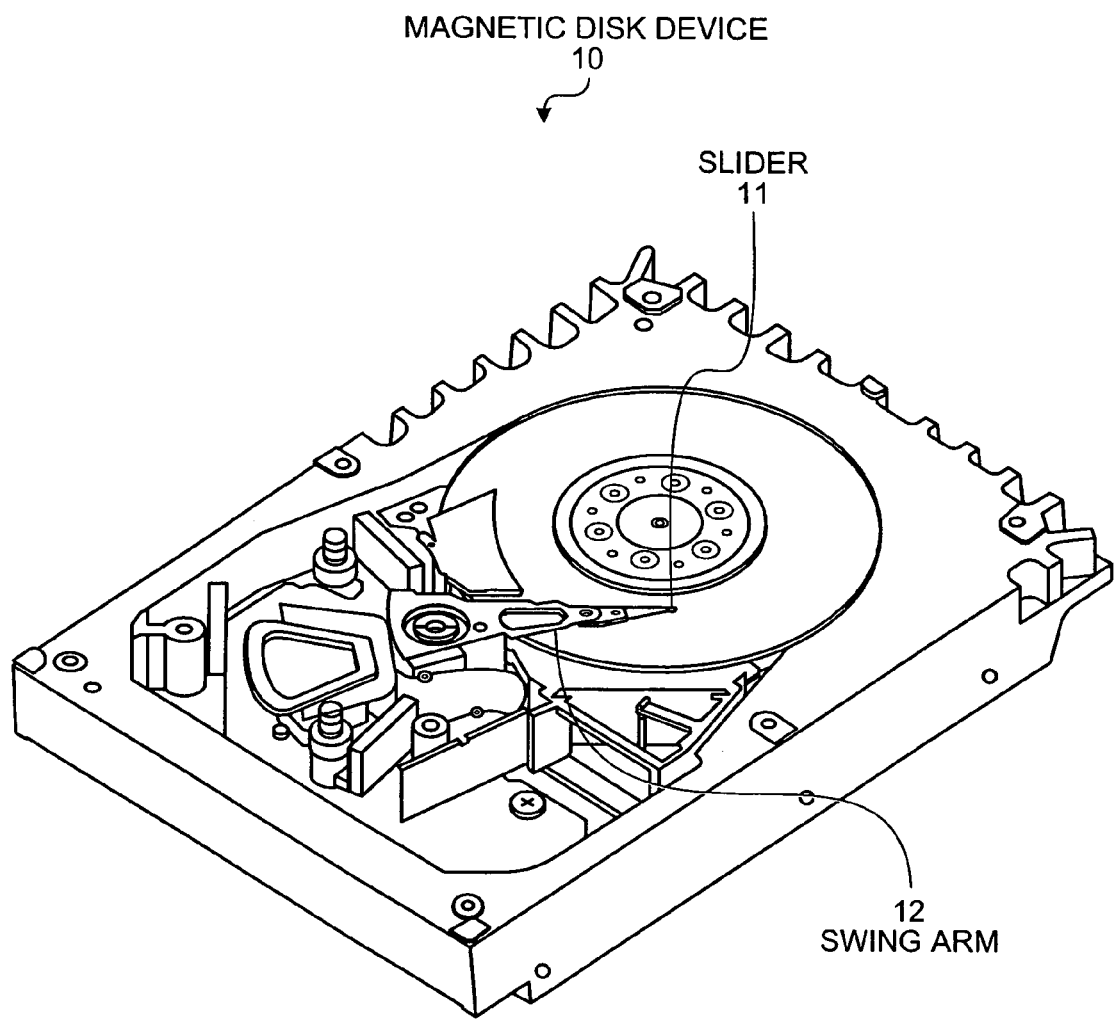
FIG. 1 is a schematic of an entire external structure of a magnetic disk device according to a first embodiment of the present invention.
Figure 2:
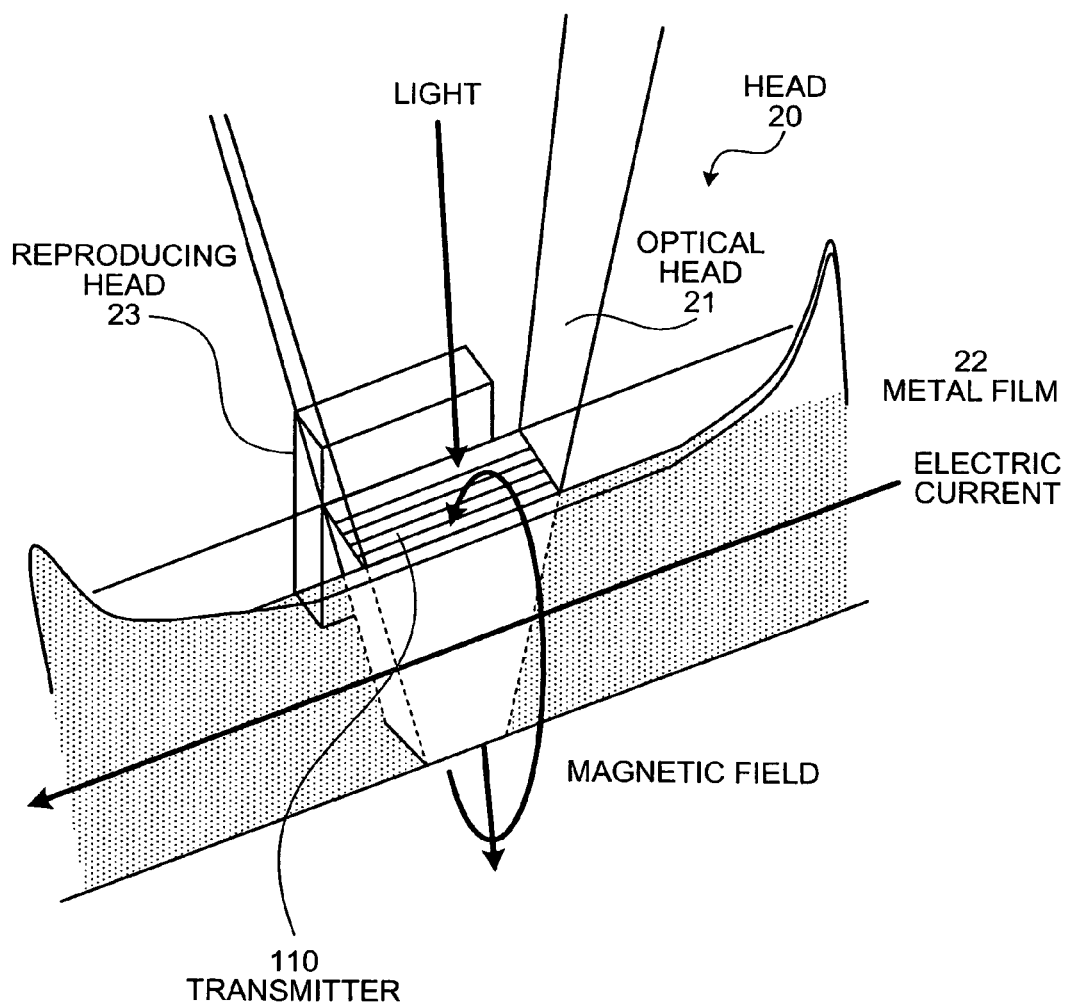
FIG. 2 is a schematic of an outline and a salient feature of the magnetic disk device according to the first embodiment.
Figure 3:
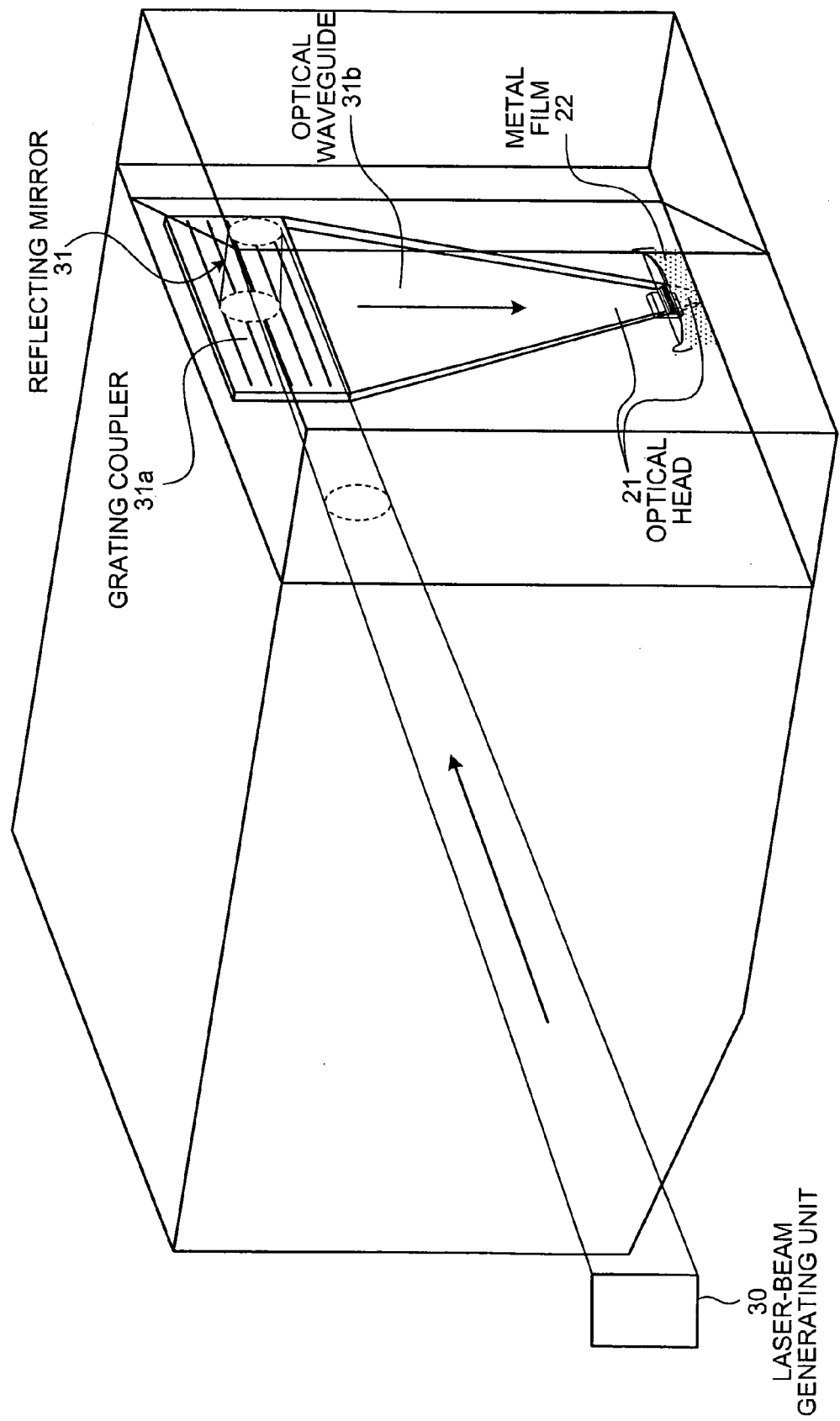
FIG. 3 is a schematic of transmission of light in the magnetic disk device.

FIG. 1 is a schematic of an entire external structure of a magnetic disk device 10 according to a first embodiment of the present invention. FIG. 2 is a schematic of the outline and the salient feature of the magnetic disk device 10. FIG. 3 is a schematic of transmission of light in the magnetic disk device 10.

In the magnetic disk device 10 according to the first embodiment, magnetic recording is carried out by generating a magnetic field using an electric current on a recording medium surface that is exposed to light. The salient feature of the magnetic disk device 10 according to the first embodiment enables to manufacture a heat-assisted magnetic recording head having a simple structure by a simple manufacturing method.

As shown in FIG. 1, the magnetic disk device 10 includes a slider 11 and a swing arm 12. The swing arm 12 having the attached slider 11 rotates to record and to reproduce data. The swing arm 12 is compact, light in weight and enables high speed search and recording.

As shown in FIG. 2, in the magnetic disk device 10 according to the first embodiment, the slider 11 includes in the apical portion a head 20 that is formed by laminating an optical head 21 that transmits the light, a metal film 22 that is subjected to passing of the electric current, and a reading head 23. In other words, the head 20 can be easily manufactured by a wafer process.

In the magnetic disk device 10, the head 20 is formed such that the reading head 23 is positioned nearest a lateral face of the slider 11 and the optical head 21 is positioned next. The metal film 22 is positioned away from the lateral face of the slider 11 than an optical path layer in the optical head 21 that transmits light.

The optical head 21 includes multiple layers of an optical film. As shown in FIG. 3, light received from a laser beam that is exposed from a laser-beam generating unit 30 via a reflecting mirror 31 and a grating coupler 31a is transmitted inside an optical waveguide 31b and finally reaches the optical head 21. A dielectric film in a layered form is included for focusing the light, thereby effectively trapping, and transmitting the light. The metal film 22 is positioned near the optical head 21 and includes multiple metal films that pass the electric current towards the recording medium surface that is exposed to light, generate the magnetic field, and carry out magnetic recording.

The wafer process enables to easily manufacture the head 20 of the magnetic disk device 10 according to the first embodiment. Thus, the aforementioned salient feature enables to manufacture the heat-assisted magnetic recording head having a simple structure by a simple manufacturing method.

Figure 4:
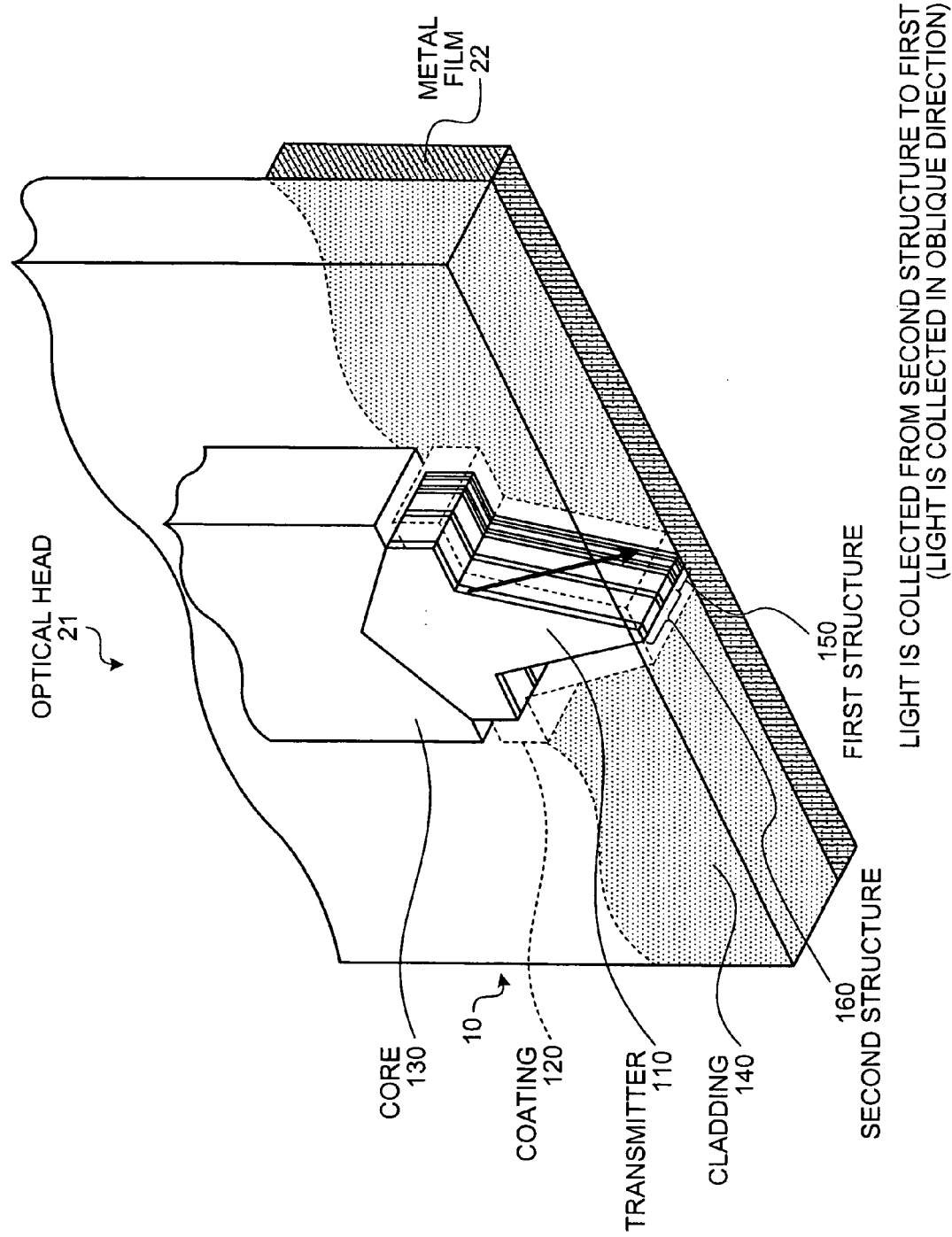
FIG. 4 is a schematic of a head having an asymmetrical structure.
Figure 5:
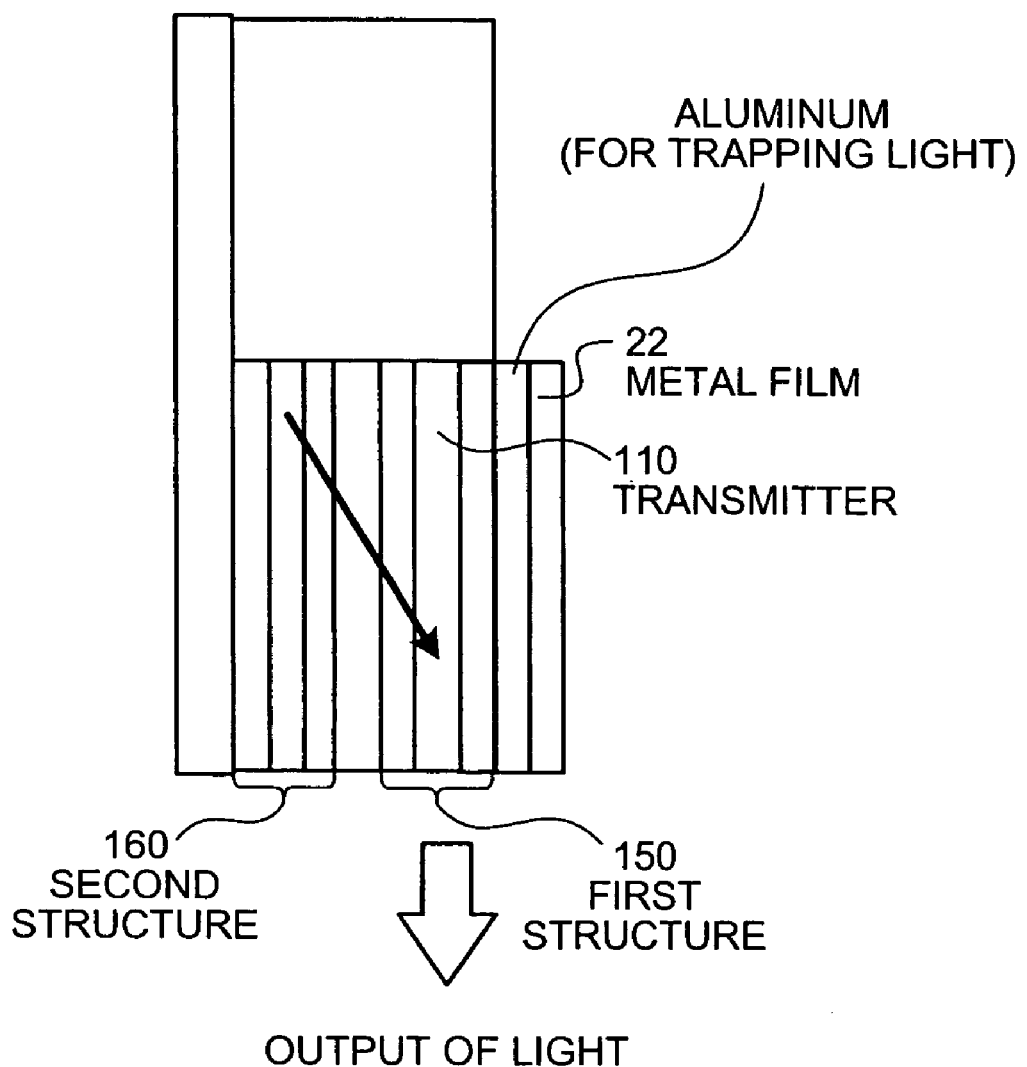
FIG. 5 is a schematic of a lateral view of a transmitter.
Figure 6:
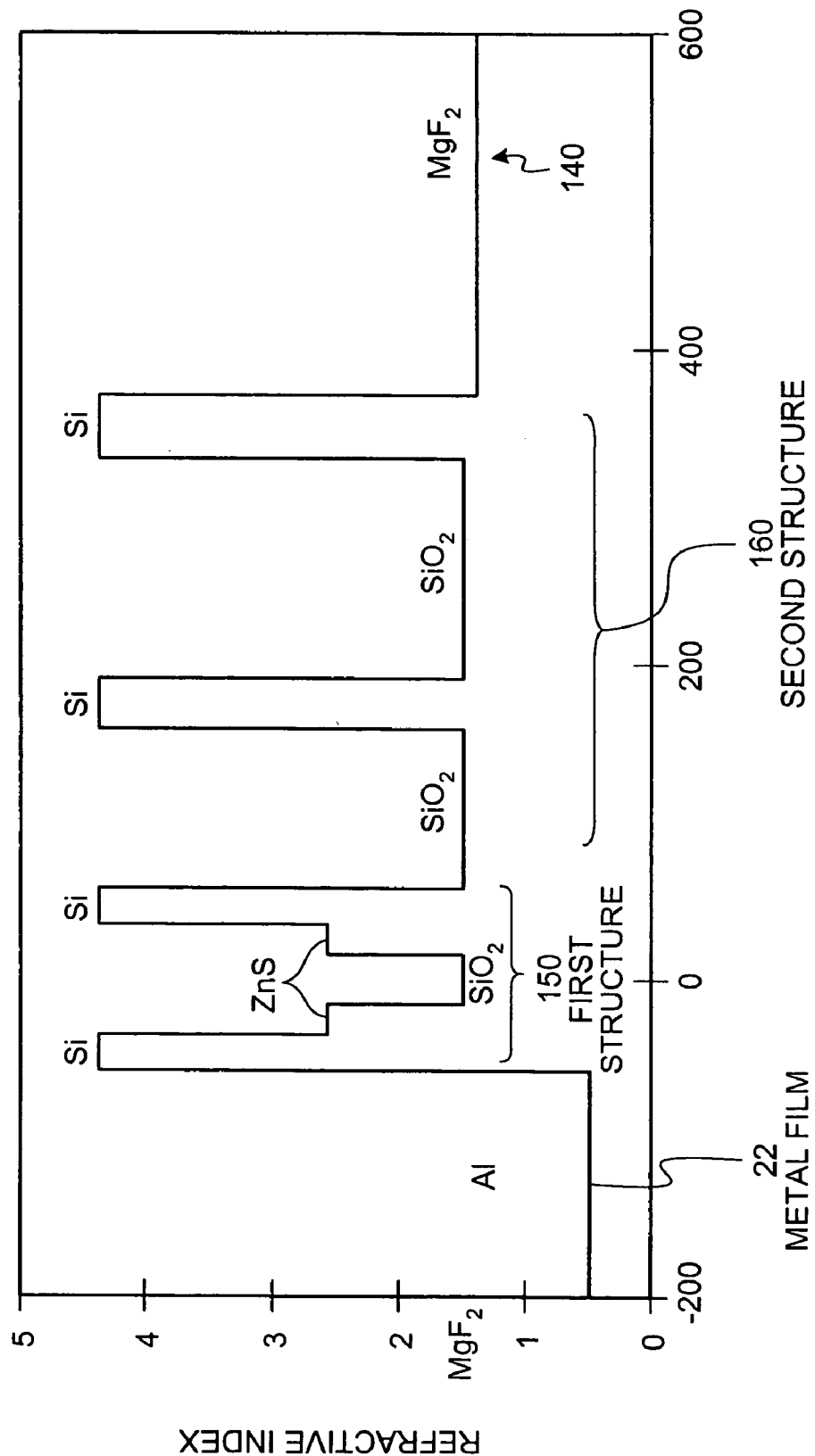
FIG. 6 is a graph of refractive index distribution representing a layered structure of an optical head.
Figure 7:
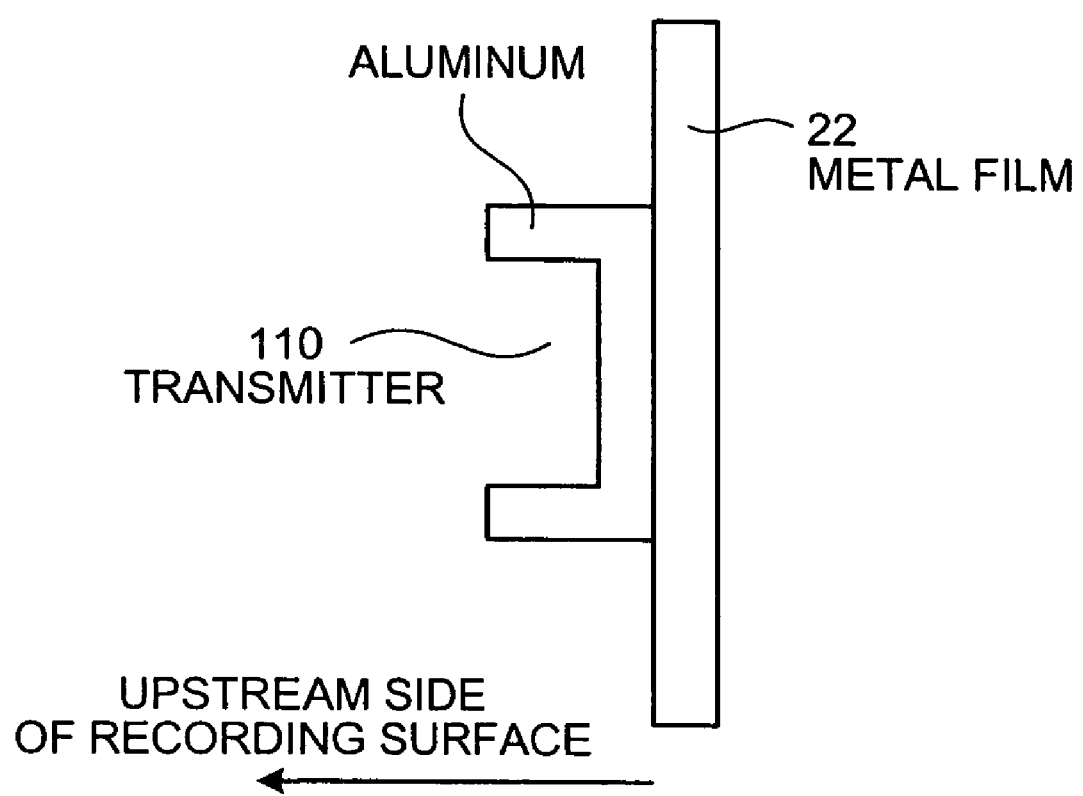
FIG. 7 is a schematic of a metal film.

FIG. 4 is a schematic of the head 20 having an asymmetrical structure. FIG. 5 is a schematic of a lateral view of a transmitter 110. FIG. 6 is a refractive index distribution graph that represents a layered structure of the optical head 21. FIG. 7 is a schematic of the metal film 22.

The head 20 includes the optical head 21 and the metal film 22. The light is transmitted and is output from an output position. The optical head 21 is formed asymmetrically with respect to the output position, and the metal film 22 is formed near a downstream side of the output position. An already existing Magneto Resistive (MR) element is used for the reading head 23. A slider board is coated with a film of the MR element, followed by a coating of an optical element that is explained later. Finally, the slider board is coated with the metal film to manufacture the head 20.

As shown in FIG. 4, the optical head 21 includes a core 130 of an optical waveguide 31b, formed of zinc sulphide that is connected to transmitter 110 and brings in the light, a cladding 140 formed of magnesium fluoride (MgF2) that traps the light in the core 130, the transmitter 110 having a tapering shape formed of a multilayered dielectric material that transmits the light brought into the core 130, focuses the light and exposes the light from the apex, and a coating 120 formed of aluminum that covers the transmitter 110, thereby trapping the light inside the transmitter. In the present embodiment, the coating 120 is also used for the metal film that passes the electric current.

The apex of the optical head 21 is included at a position where electromagnetic field strength due to focusing by the transmitter 110 is the strongest. The transmitter 110 and the core 130 are optically connected. A refractive index of the core 130 differs from a refractive index of the transmitter 110. A bottom edge of the transmitter 110 that is protruding towards the core 130 causes the light from the core 130 to be refracted towards the center and the light enters the transmitter 110, thereby enhancing focusing efficiency inside the transmitter 110. The connecting surfaces of the transmitter 110 and the core 130 that are shown in FIG. 2 form a straight line. Although such linear surfaces can also be used, in the example explained in the present embodiment, the bottom edge of the transmitter 110 is protruding towards the core 130.

As shown in FIG. 5, the transmitter 110 has a layered structure formed of the dielectric material. The layered structure includes a first structure 150 that collects the light and a second structure 160 that biases the transmitted light towards the first structure 150 consisting of multilayered films. For efficiently getting light having a beam size that is significantly less than a wavelength, the first structure 150 output miniscule light. The second structure 160 causes the light to be collected on the first structure 150. Although the entire multilayered films (in other words, both the first structure 150 and the second structure 160) are exposed to the light, the second structure 160 includes a function to collect the light on the first structure 150, thereby enabling the light to be collected on the first structure 150 and enabling the light to be exposed.

The coating 120 causes the transmitted light to be reflected inside the transmitter 110, thereby causing the light to be focused, and simultaneously prevents exuding of the transmitted light from portions other than the apex. Using metal as the material for the coating 120 enables to get sufficient reflection even if an incidence angle of the light with a side of the tapering portion of the transmitter 110 is small, thus enabling to get a sufficient focusing efficiency even if the apical tapering portion is large. A large apex angle results in a short transmission distance of the light inside the transmitter 110 and less internal transmission loss, thereby resulting in a high transmission efficiency of the transmitter 110. Aluminum (having n=0.49 and k=4.86) is used as an example of the metal.

The refractive index distribution that represents the layered structure of the optical head 21 is explained with reference to FIG. 6. The first structure 150 of the optical head 21 includes a first layer formed of silicon dioxide (n=1.48) having a thickness of 30 nm, a pair of second layers formed of zinc sulphide (n=2.437) having a thickness of 20 nm that cover the first layer, and silicon (n=4.380, k=2.02) having a thickness of 20 nm. The first structure 150 also includes a pair of third layers that further cover the first layer and the second layers. Silicon is an opaque dielectric material having a high relative permittivity. Silicon dioxide is a transparent dielectric material. Zinc sulphide is a transparent dielectric material having a higher refractive index than silicon dioxide.

The second structure 160 includes a low refractive index layer formed of silicon dioxide having a thickness of 100 nm, a high refractive index layer formed of silicon having a thickness of 30 nm, a low refractive index layer formed of silicon dioxide having a thickness of 140 nm, and a high refractive index layer formed of silicon having a thickness of 42 nm. Thus, the second structure 160 includes a structure of repeated pairs of a low refractive index layer and a high refractive index layer such that a difference between the refractive indices of the low refractive index layer and the high refractive index layer exceeds 1.0. A layer thickness ratio of the low refractive index layer and the high refractive index layer is fixed for each pair, and a total layer thickness of each pair differs from pair to pair. Using the aforementioned layered structure in the second'structure 160 causes the transmitted light to be biased towards the first structure 150, and finally, the light is focused in the first structure 150.

The metal plate at the end towards the side of the first structure 150 is positioned downstream with respect to light exposure, thereby enabling to pass the electric current through the metal plate, generate a magnetic field on the recording medium surface according to Ampere's law, and carry out recording using the magnetic field and heat due to the light.

The metal film on the metal plate is the coating 120 formed of aluminum. Passing the electric current through the metal film generates a magnetic field in the surrounding area. Optical characteristics of the metal film are not affected by passing the electric current through the metal film. For example, according to Biot-Savart law, passing an electric current of 100 mA through the metal film (having a thickness of 100 nm and a height of 1 μm) generates a strong magnetic field of 750 [Oe] on the recording medium surface that is separated by a distance of 15 nm. The strong magnetic field and the light having a miniscule light spot size of 70 nm to 80 nm and strength of 2 mW in the same position use miniscule heat distribution generated in the recording medium due to absorption of light, thereby enabling Curie point recording that is known as magneto-optical recording, thus enabling miniscule magnetic recording. The reading head (such as an MR head and a Tunnel Magneto Resistive (TMR) head) that is included in the same metal plate also enables reading of signals. When using the metal film at the end towards the side of the first structure 150, dry etching can be used to manufacture a multilayered film having a predetermined pattern as shown in FIG. 4.

Returning to FIG. 4, the metal film 22 is thin near the portion that is exposed to the light and thick in other portions. Reducing the thickness of the metal film 22 enables to generate a strong magnetic field, and especially enables to strengthen the magnetic field in the portion that is exposed to the light. Passing the electric current through the metal film 22 that is positioned near the optical head 21 and includes multiple metal films generates a magnetic field. To be specific, as shown in FIG. 7 (schematic of the head seen from the recording medium side), electricity is passed through the downstream side of the metal film 22 with respect to the recording medium in the form of the slider that is exposed to the light, and the generated magnetic field is used as a magnetic field for recording. If inside of the transmitter includes multiple metal films, the electric current can be passed through the metal film that is positioned nearest the downstream side with respect to the recording medium exposed to the light, or the electric current can be passed through the multiple metal films including the nearest metal film, and the generated magnetic field can be used.

Figure 8:
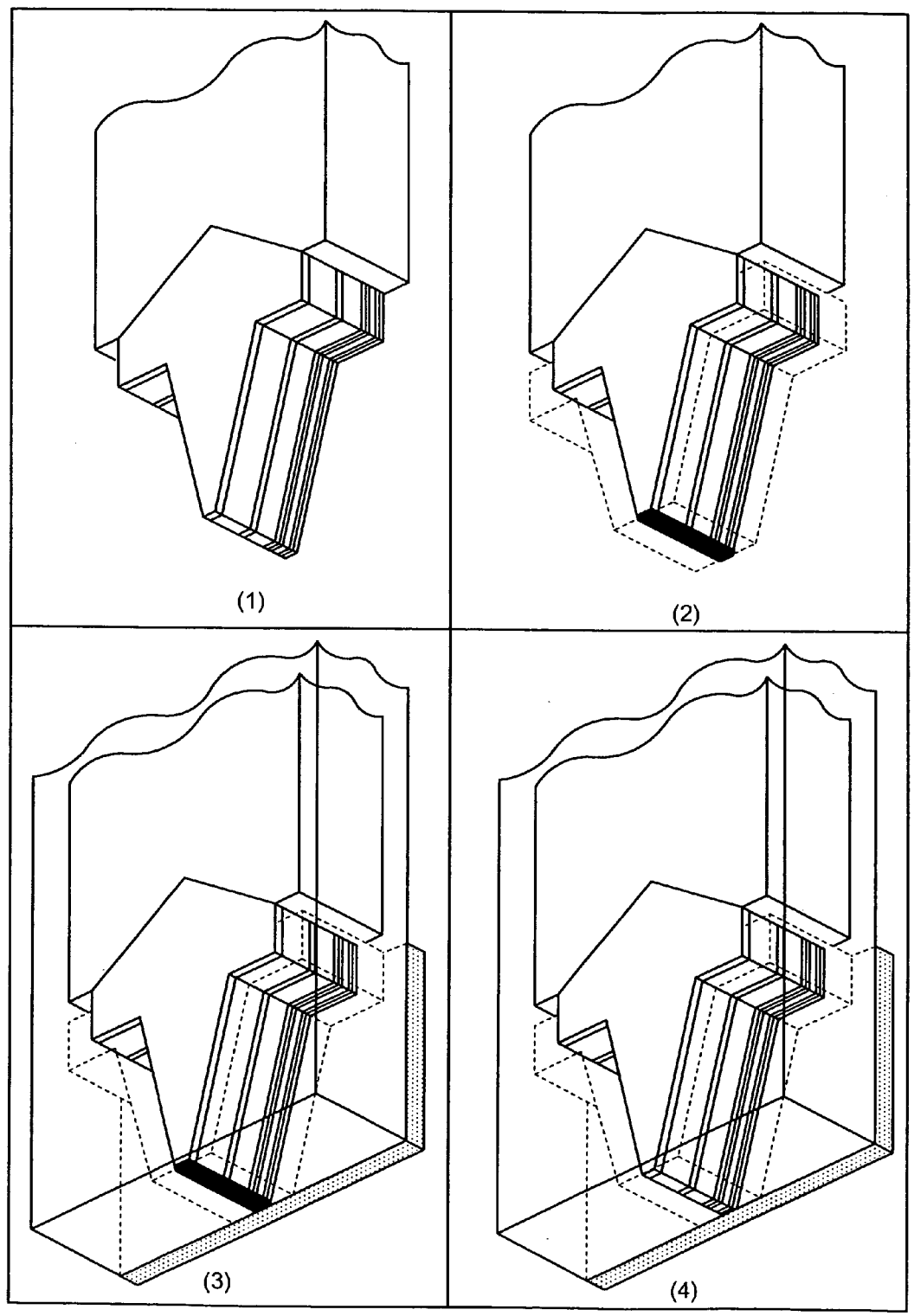
FIG. 8 is a schematic of a manufacturing process of a head in the magnetic disk device.

FIG. 8 is a schematic of the manufacturing process of the head 20 in the magnetic disk device 10 according to the first embodiment. Because the head 20 is manufactured by etching masking the metal film 22 in the same shape as the pattern that is used to manufacture the optical head 21, the optical head and the head for magnetic recording are manufactured simultaneously.

In the example shown in FIG. 8, the board that is coated with film, in other words, the slider for the magnetic disk is on the front side of the paper surface, and the film is sequentially coated in the direction away from the paper surface. In other words, a view seen from the board side is shown in FIG. 8. The board is not shown in FIG. 8. First, the entire surface of the board is coated with the clad material of the optical waveguide 31b and is coated with the layered structure that is the same as the layered structure of the transmitter 110, and finally the board is coated with aluminum layer that traps the light and prevents leakage of the light. Next, for forming a pattern of the transmitter 110, resist is applied over the aluminum surface using a lithography exposure process, the pattern is created using an electronic beam, and the aluminum layer immediately below the resist is dry etched. The etched aluminum layer having the shape of the desired transmitter is used as a mask to dry etch the transmitter 110 having the multilayered coating into the desired shape, thereby enabling to manufacture the transmitter 110 (see (1) of FIG. 8). Portions other than the core 130 that is connected to the transmitter 110 are covered with the resist using a liftoff method and the core is coated (see (1) of FIG. 8). Next, for coating aluminum to prevent leakage of light from the tapering portion of the transmitter 110, especially from the sides, portions other than the portion subjected to aluminum coating are similarly covered with the resist using the liftoff method, and aluminum is coated to form the coating 120 (see (2) of FIG. 8). Similarly, the cladding 140 is also coated using the liftoff method that is used to cover the core 130 except the transmitter 110 (see (3) of FIG. 8). Thus, when seen from the board side, the outermost portion of the transmitter 110 is formed of aluminum having the shape of the transmitter. Next, aluminum is partially coated over the aluminum having the shape of the transmitter for creating and adding electrodes that are similarly formed of aluminum and pass electric current through the aluminum portion, thus electrically connecting the aluminum portion and the aluminum electrodes, and enabling to manufacture the head shown in FIG. 4 (see (3) of FIG. 8). Because the aluminum that is added in the form of electrodes uses the aluminum having the shape of the transmitter to generate the magnetic field, allowance for error in the positioning of electrode coating is high. Finally, the apical surface of the transmitter 110 is subjected to a high precision polishing process by lapping to manufacture an exposure window (see (4) of FIG. 8).

According to the first embodiment, the head 20 is manufactured by laminating the optical head 21 that transmits the light and the metal film 22 that is subjected to passing of the electric current. The laser-beam generating unit 30 exposes the light such that the recording medium surface is exposed to the light transmitted by the optical head 21, and a unit passes the electric current through the metal film to generate a magnetic field, thereby enabling to manufacture a heat-assisted magnetic recording head that is simple in structure and uses a simple manufacturing method.

Furthermore, according to the first embodiment, the optical head 21 is formed asymmetrically with respect to the output position that outputs the transmitted light, and the metal film 22 is formed near the downstream side of the output position. An electric-current output unit outputs the electric current through the metal film 22 that is formed near the downstream side of the output position of light. Thus, a position exposed to the light and a position exposed to the magnetic field are brought near each other to enable recording, thus enabling to prevent heat fluctuation due to a difference between an exposure time to the light and exposure time to the magnetic field.

Moreover, according to the first embodiment, the head 20 includes by laminating a plurality of metal films 22 along with the optical head 21, and the electric-current output unit passes the electric current only through the metal film that is formed near the output position that outputs the transmitted light, thereby enabling to curb the power consumption.

Furthermore, according to the first embodiment, the head 20 includes by laminating the optical head 21 and the metal film 22 such that the metal film 22 is thin in a vertical direction with respect to the recording medium near the output position that outputs the transmitted light and become increasingly thick according to the distance from the output position, thereby enabling to strengthen the magnetic field in portions where the metal film 22 is narrow, and enabling to ease the passage of the electric current in portions where the metal film 22 is wide.

Moreover, according to the first embodiment, the head 20 is formed such that the reading head 23 is positioned nearest the lateral face of the slider and the optical head 21 is positioned next. The metal film 22 is positioned away from the lateral face of the slider than the optical path layer in the optical head 21 that transmits light, thereby enabling to manufacture the heat-assisted magnetic recording head that is simple in structure by a simple manufacturing method.

Furthermore, according to the first embodiment, the head 20 also includes the reading head 23 apart from the optical head 21 and the metal film 22, thereby enabling reproduction of data along with magnetic recording.

Moreover, according to the first embodiment, the head 20 includes the optical head 21 formed of aluminum, thereby enabling to simplify patterning of the optical head and magnetic recording.

Furthermore, according to the first embodiment, the head 20 is manufactured by etching masking the metal film in the same shape as the pattern that is used to manufacture the optical film, thereby enabling to simultaneously manufacture an optical head and a magnetic recording head.

Various embodiments of the present invention other than the first embodiment can also be construed. Another embodiment of the present invention is explained as a second embodiment.

Figure 9:
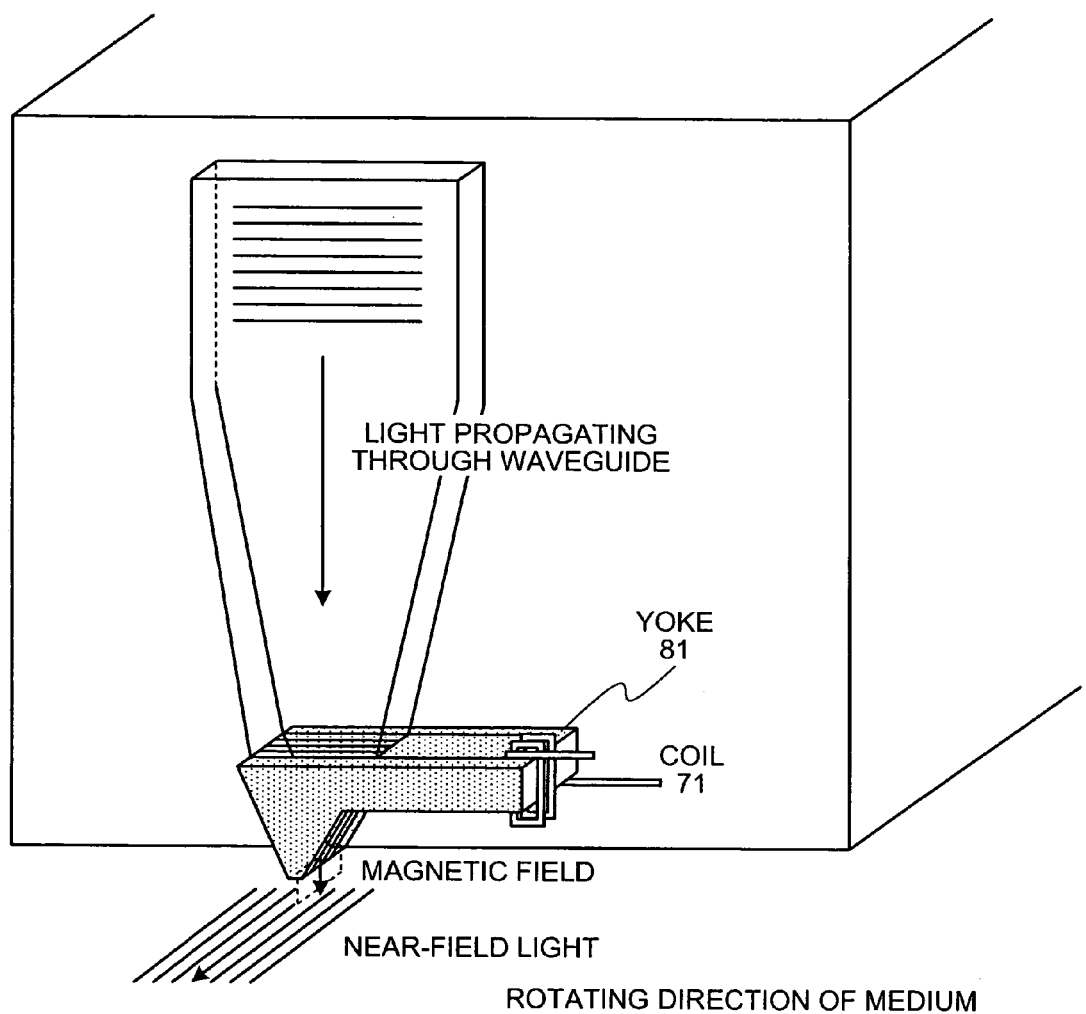
FIG. 9 is a schematic of a head that uses a yoke.

As shown in FIG. 9, in the present invention, a yoke 81 including a coil 71 can also be used for generating a stronger magnetic field. The head includes the optical film and the metal film such that the yoke that generates the magnetic field and the optical waveguide that guides the light touch only in a portion that generates near-field light. Nickel based, cobalt based, or iron based hard magnetic material such as nickel iron oxide or siderite can be used as material for the yoke.

Figure 10:
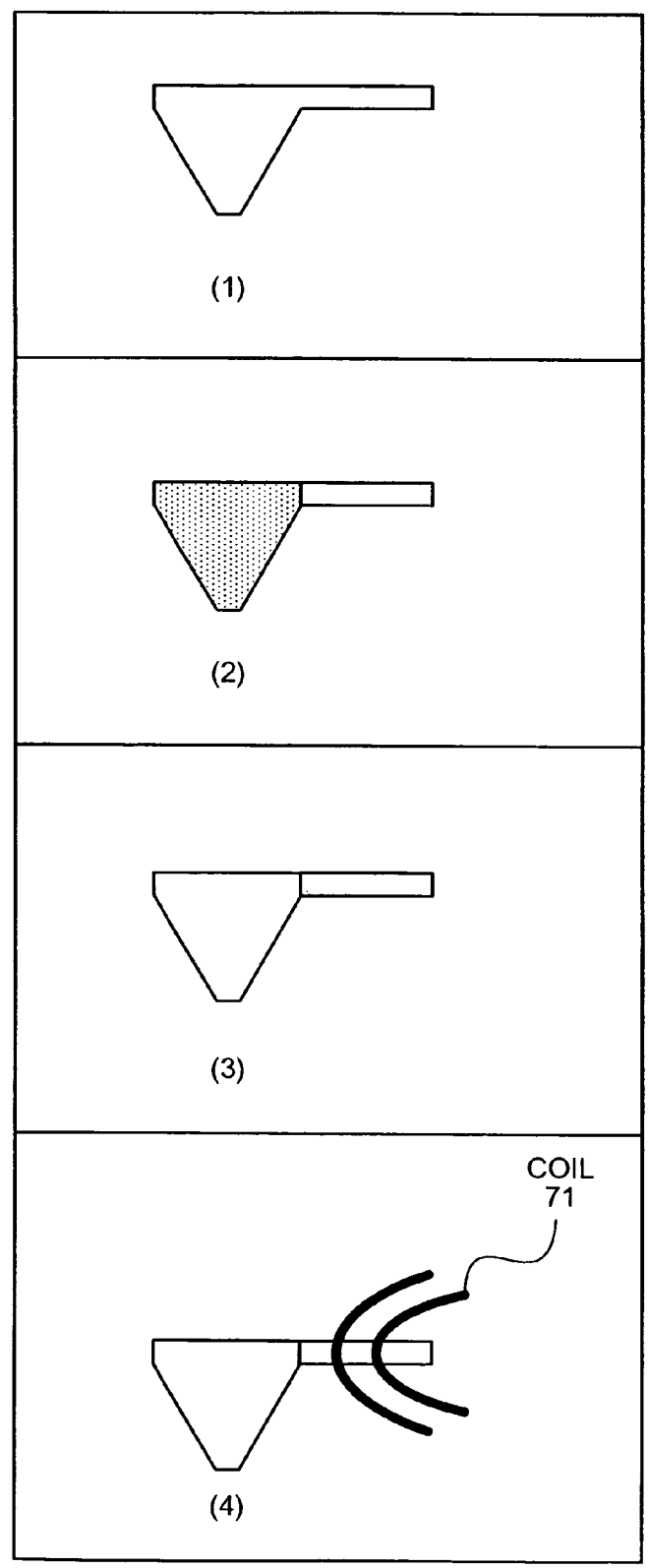
FIG. 10 is a schematic of the manufacturing process of the head in the magnetic disk device.

As shown in FIG. 10, a portion of the yoke is formed by patterning from a highly hard magnetic material such as nickel iron oxide, siderite etc. (see (1) of FIG. 10). A thin optical film formed of multilayered films is sequentially coated (see (2) of FIG. 10). Another yoke is formed on the optical film and patterned (see (3) of FIG. 10). Finally, the coil 71 is wound to the yoke (see (4) of FIG. 10). The same pattern is used for a pattern of the yoke and a pattern of the multilayered optical film, thereby preventing a misalignment of a magnetic storage position and an optical recording position. Because thermo magnetic recording does not need a strong magnetic field that is necessary in large scale magnetic recording, only several turns of the coil can be used. Copper, gold, or aluminum can also be used as a material for the yoke 81. The coil 71 can be manufactured using a manufacturing method that is similar to the manufacturing method of a coil manufactured in a magnetic disk.

Thus, the head includes the optical film and the metal film such that the yoke that generates the magnetic field and the optical waveguide that guides the light touch only in a portion that generates near-field light, thereby enabling to generate a stronger magnetic field and enabling to prevent optical loss of the optical waveguide.

The optical head that is asymmetrical with respect to the output position that outputs the transmitted light is explained in the first embodiment. However, the present invention is not to be thus limited, and an optical head and a metal film that are symmetrical with respect to the output position that outputs the transmitted light can also be used.

Figure 11:
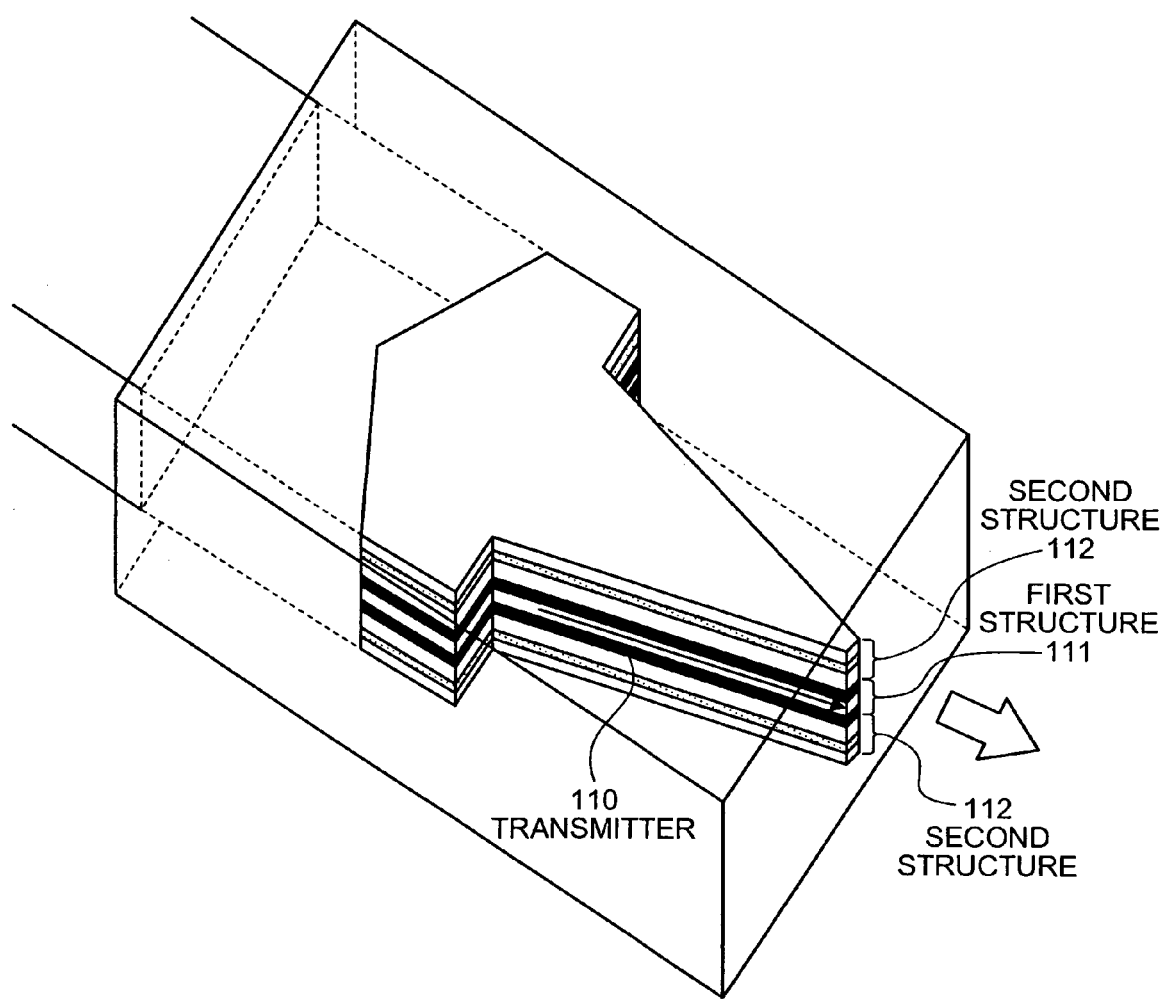
FIG. 11 is a schematic of a head having a symmetrical structure.

As shown in FIG. 11, the head includes the optical film and the metal film that are symmetrical with respect to the output position that outputs the transmitted light, and the electric-current output unit outputs the electric current only through the metal film that is formed near the downstream side of the output position of light. For example, the optical head includes a first structure 111 that outputs miniscule light and a second structure 112 that is positioned on both sides of the first structure 111 for collecting the light in the first structure 111. The second structure 112 includes a grating formed of multilayered films that do not allow passage of light. A period of the grating is less than a wavelength of low period, thereby focusing the light in a central portion.

Thus, the head includes the optical head and the metal films are symmetrical with respect to the output position that outputs the transmitted light, and the electric-current output unit outputs the electric current only through the metal film that is formed near the downstream side of the output position of light, thereby enabling to curb the power consumption by passing the electric current only through the downstream side.

Figure 12:
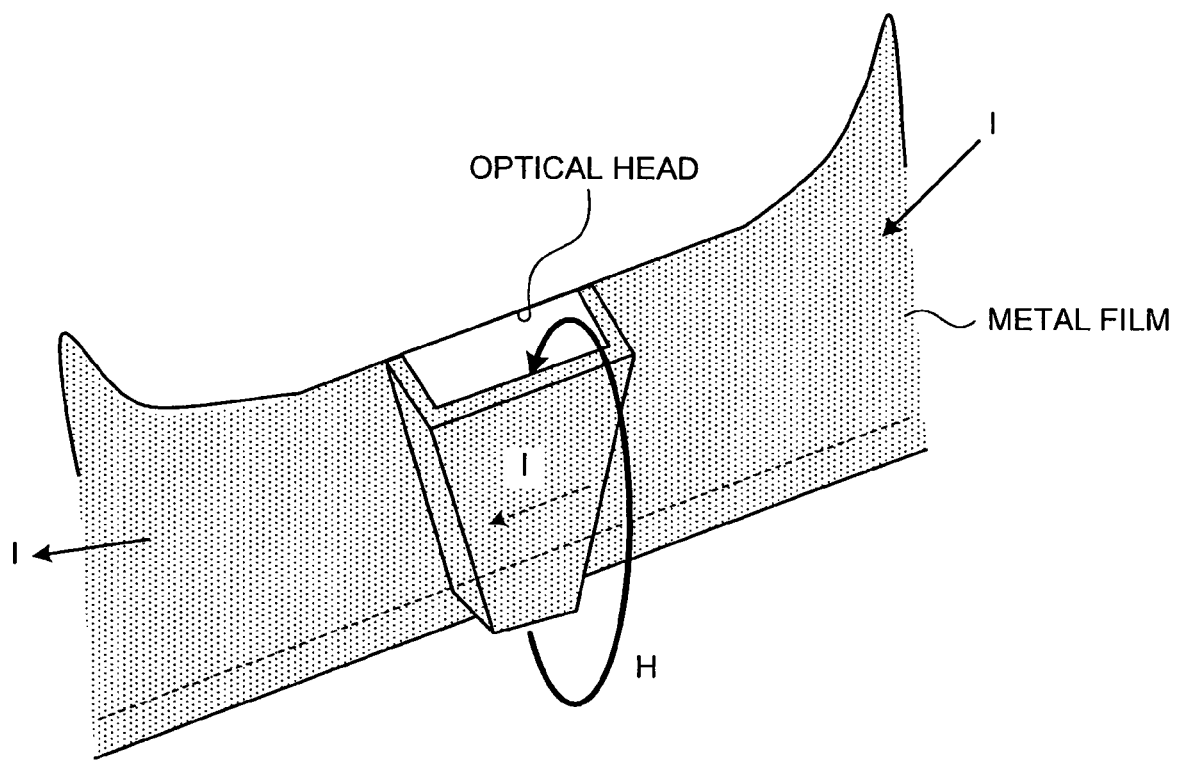
FIG. 12 is a schematic of an electric current that is passed through the metal film.

Passing of the electric current only through the metal film that is positioned near the downstream side with respect to the recording medium exposed to the light is explained in the first embodiment. However, the present invention is not to be thus limited, and the electric current can also be passed through multiple metal films. As shown in FIG. 12, the metal films use an asymmetrical optical waveguide such that a cladding is included on the board side, but not included on the opposite side. Using the asymmetrical optical waveguide further simplifies the manufacturing process.

Thus, the electric-current output unit passes the electric current through the multiple metal films, thereby enabling to simplify control of the electric current.

According to the present invention, the laser-beam generating unit of a magnetic recording device can also control power of the light according to the temperature of the recording medium surface. In other words, the laser-beam generating unit exercises control by reducing the laser power if the temperature is high, thereby curbing the power consumption.

Figure 13:
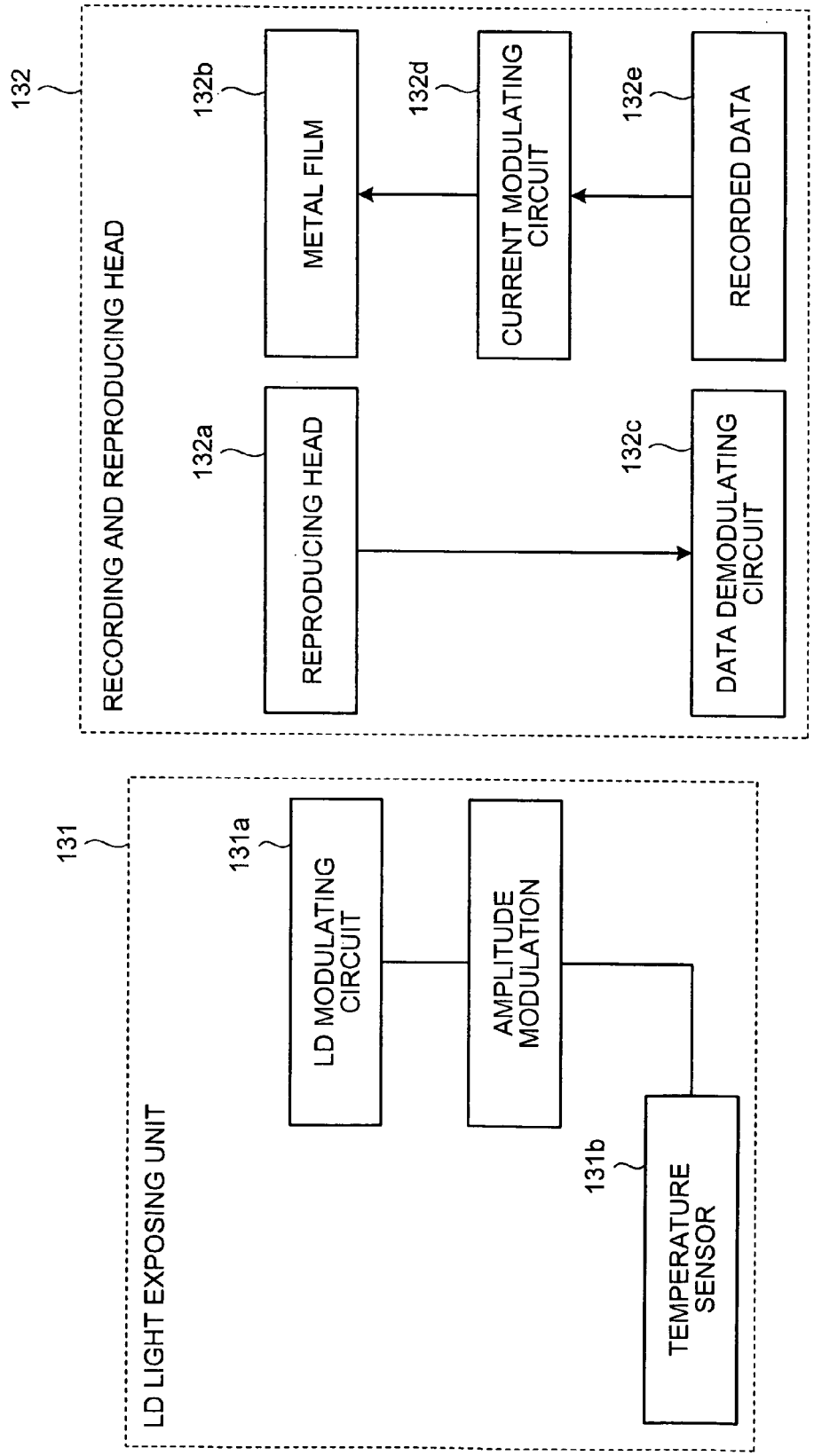
FIG. 13 is a schematic of a structure of a circuit.

FIG. 13 is a block diagram of a structure of the circuit in the magnetic recording device. In the magnetic recording device, a laser-diode (LD) light exposing unit 131 includes an LD modulating circuit 131*a* and a temperature sensor 131*b*. If the temperature sensor 131*b* detects a high temperature, the LD modulating circuit 131*a* reduces the laser power, and carries out laser power modulation with temperature correction.

As shown in FIG. 13, a recording and reading head 132 includes a reading head 132*a*, a metal film 132*b*, a data demodulating circuit 132*c*, a current modulating circuit 132*d*, and recorded data 132*e*. Data read from the reading head is transferred to the data demodulating circuit 132*c*, the current modulating circuit 132*d* gets the recorded data 132*e*, and passes the electric current through the metal film 132*b* based on the recorded data.

Thus, the laser-beam generating unit controls power of the light according to the temperature of the recording medium surface, thereby enabling to curb the power consumption.

According to the present invention, the magnetic recording device can also exercise control by exposing the light using on/off modulation. To be specific, a laser source in the magnetic recording device for adding heat carries out on/off modulation that exceeds at least 100 MHz.

Thus, exposing the light by on/off modulation enables to curb the power consumption.

Figure 14:
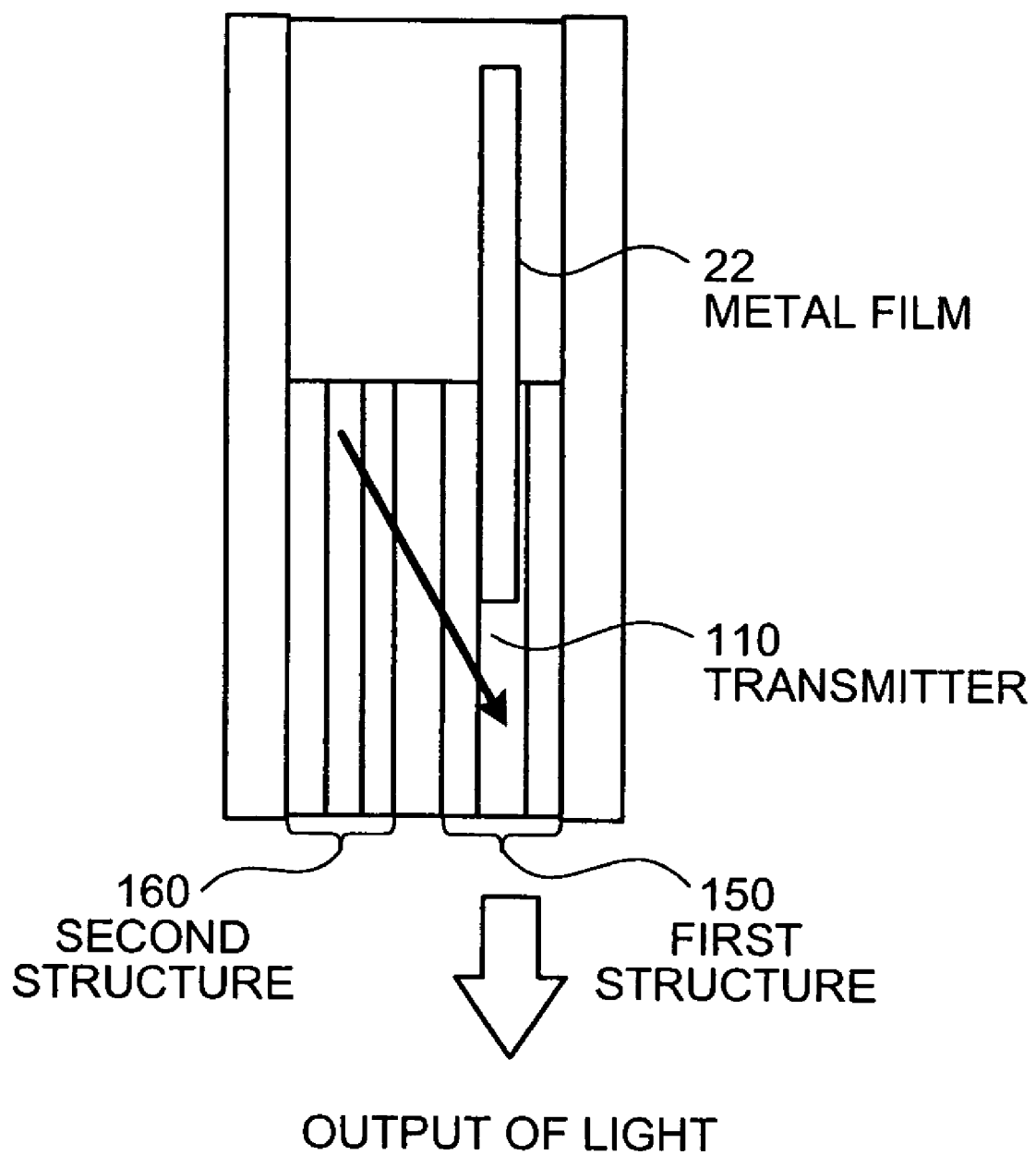
FIG. 14 is a schematic of a position of the metal film.

As shown in FIG. 14, according to the present invention, the metal film can be positioned away from the recording medium side. To be specific, a bottom surface of the metal film is positioned away with respect to the recording medium than an output surface of the thin optical film.

Thus, in the head, the bottom surface of the metal film is formed by laminating in a position that is further away with respect to the recording medium surface than the bottom surface of the optical film, thereby enabling to prevent the metal film from getting affected due to heat.

Figure 15:
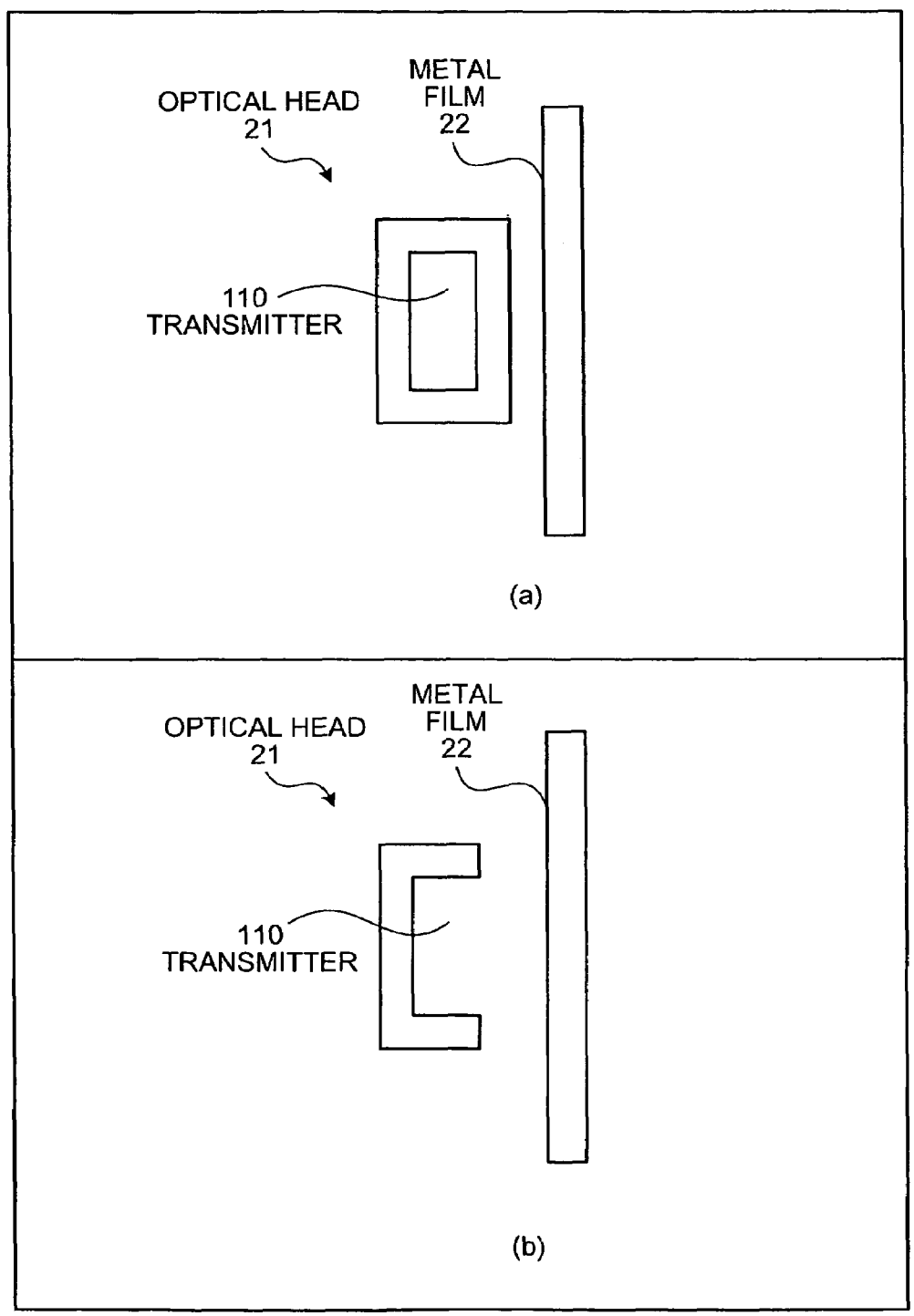
FIG. 15 is a schematic of an example of a shape of the metal film.

The metal film and the optical head that are close to each other are explained in the first embodiment. However, the present invention is not to be thus limited, and as shown in FIG. 15, the optical head and the metal film can be marginally separated or the metal film can be included without covering the entire surface of the optical head.

According to an embodiment of the present invention, a head includes by laminating an optical film that transmits light and a metal film that is subjected to passing of an electric current, a light exposing unit exposes light such that the light is transmitted by the optical film and a recording medium surface is exposed to the light, and the electric current is output through the metal film. Thus, the head can be manufactured by a wafer process, thereby enabling to manufacture a heat-assisted magnetic recording head that is simple in structure by a simple manufacturing method.

Furthermore, according to an embodiment of the present invention, the head includes an optical head that is formed asymmetrically with respect to an output position that outputs the transmitted light, and the metal film included in the head is formed near a downstream side of the output position. An electric-current output unit outputs the electric current through the metal film that is formed near the downstream side of the output position of light. Thus, a position exposed to the light and a position exposed to the magnetic field are brought near each other, thereby enabling to prevent heat fluctuation.

Moreover, according to an embodiment of the present invention, the head includes the optical head and the metal film that are formed symmetrically with respect to the output position that outputs the transmitted light and the electric-current output unit passes the electric current only through the metal film that is formed near the downstream side of the output position of the light, thereby enabling to curb the power consumption by passing the electric current only through the downstream side.

Furthermore, according to an embodiment of the present invention, the head includes by laminating multiple metal films along with the optical head, and the electric-current output unit outputs the electric current only through the metal film that is formed near the output position that outputs the transmitted light, thereby enabling to curb the power consumption.

Moreover, according to an embodiment of the present invention, the head includes by laminating multiple metal films along with the optical head, and the electric-current output unit outputs the electric current through the multiple metal films, thereby enabling to simplify control of the electric current.

Furthermore, according to an embodiment of the present invention, the head includes by laminating the optical head and the metal film such that the metal film is thin near the output position that outputs the transmitted light and becomes increasingly thick in a vertical direction with respect to the recording medium according to the distance from the output position, thereby enabling to strengthen the magnetic field in portions where the metal film is narrow, and enabling to ease the passage of the electric current in portions where the metal film is wide.

Moreover, according to an embodiment of the present invention, the head is formed such that a reading head is positioned nearest a lateral face of a slider and the optical head is positioned next. The metal film is positioned away from the lateral face of the slider than an optical path layer in the optical head that transmits the light, thereby enabling to manufacture the heat-assisted magnetic recording head that is simple in structure by a simple manufacturing method.

Furthermore, according to an embodiment of the present invention, the head includes by laminating the optical film and the metal film such that a bottom surface of the metal film is positioned further away with respect to the recording medium surface than a bottom surface of the optical film, thereby enabling to prevent the metal film from getting affected due to heat.

Moreover, according to an embodiment of the present invention, the optical film in the head is formed of aluminum, thereby enabling to simplify patterning.

Furthermore, according to an embodiment of the present invention, the head is manufactured by etching masking the metal film in the same shape as a shape of the pattern that is used to manufacture the optical head, thereby enabling to simultaneously manufacture the optical head and the head for magnetic recording.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A magnetic disk device that performs magnetic recording by generating a magnetic field using an electric current on a light-irradiated surface of a recording medium, the magnetic disk device comprising:
  a head unit that is formed by laminating optical films and a metal film;
  wherein the optical films guide and converge an incident light to irradiate a surface of the recording medium with a converged light spot, and applying the electric current to the metal film causes the metal film to generate a magnetic field so as to serve as a magnetic head; and
an electric-current output unit that outputs the electric current to the metal film.

2. The magnetic disk device according to claim 1, wherein
  the optical films are asymmetrically layered such that the converged light spot is output from a middle one of the optical films, and
  the metal film is formed close to a downstream side of the middle one of the optical films.

3. The magnetic disk device according to claim 1, wherein
  the optical films and the metal film are symmetrically layered such that the converged light spot is output from a middle one of the optical films, the head unit has a second metal film such that dielectric materials are disposed between the metal film and the second metal film, and
  the electric-current output unit outputs the electric current only to a metal film that is formed close to a downstream side of the middle one of the optical films.

4. The magnetic disk device according to claim 1, wherein
  the head is formed by laminating a plurality of metal films with the optical films, and
  the electric-current output unit outputs the electric current to one of the metal films that is formed close to a downstream side of one of the metal films through which the converged light spot is output.

5. The magnetic disk device according to claim 1, wherein
  the head is formed by laminating a plurality of metal films with the optical films, and
  the electric-current output unit outputs the electric current to the metal films.

6. The magnetic disk device according to claim 1, wherein
  the metal film is adapted to be thinner in the vicinity of an output position through which the converged light spot is output and to be thicker further away vertically from the output position.

7. The magnetic disk device according to claim 1, further including a slider having the head unit formed on one side of an end portion thereof, wherein
the head unit sequentially includes a reading head, the optical films and the metal film in this order from said one side of the end portion of the slider.

8. The magnetic disk device according to claim 1, wherein the head includes a reading head, in addition to the optical films and the metal film.

9. The magnetic disk device according to claim 1, wherein a bottom surface of the metal film is positioned further from the surface of the recording medium than a bottom surface of the optical films.

10. The magnetic disk device according to claim 1, wherein the optical films are an aluminum film.

11. The magnetic disk device according to claim 1, wherein the head is formed by etching masking the metal film in same shape as a shape of a pattern of the optical films.

12. The magnetic disk device according to claim 1, further comprising a yoke and a coil wound around a portion of the yoke so as to serve en bloc as a recording head, one side of the yoke constituting the metal film, wherein
the yoke is so adapted as to contact only a portion of the light-irradiating head which portion generates a near-field light.

13. The magnetic disk device according to claim 1, wherein a power of the converged light spot is controlled based on a temperature of the surface of the recording medium.

14. The magnetic disk device according to claim 1, wherein the incident light is on-off modulated.

15. A magnetic disk device that performs magnetic recording by generating a magnetic field using an electric current on a light-irradiated surface of a recording medium, the magnetic disk device comprising:

a head unit that is formed by laminating an optical film that transmits a light and a metal film through which the electric current flows;

a light exposing unit that irradiates the light in such a manner that the light is transmitted through the optical film and irradiated on a surface of the recording medium; and an electric-current output unit that outputs the electric current to the metal film, wherein the metal film is a thin film close to an output position through which a transmitted light is output and becomes thicker along a distance from the output position.

16. A magnetic disk device that performs magnetic recording by generating a magnetic field using an electric current on a light-irradiated surface of a recording medium, the magnetic disk device comprising:

a head unit that is formed by laminating an optical film that transmits a light and a metal film through which the electric current flows;

a light exposing unit that irradiates the light in such a manner that the light is transmitted through the optical film and irradiated on a surface of the recording medium; and an electric-current output unit that outputs the electric current to the metal film, wherein the head sequentially includes a reading head and the optical film with respect to a lateral side of a slider, and the metal film is formed in such a manner that the metal film is positioned further from the lateral face of the slider than an optical path layer in the optical film.

* * * * *